(12) United States Patent
Joy et al.

(10) Patent No.: US 6,728,263 B2
(45) Date of Patent: *Apr. 27, 2004

(54) DYNAMIC SIZING OF DATA PACKETS

(75) Inventors: George Joy, Kirkland, WA (US); Philippe Ferriere, Bellevue, WA (US); Michael R. VanBuskirk, Redmond, WA (US); John R. Selbie, Redmond, WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/135,704

(22) Filed: Aug. 18, 1998

(65) Prior Publication Data

US 2002/0093982 A1 Jul. 18, 2002

(51) Int. Cl.[7] .................................................. H04J 3/16
(52) U.S. Cl. ..................... 370/468; 370/437; 370/477; 370/395.21; 709/104; 709/226
(58) Field of Search .................... 370/477, 230, 370/233, 234, 235, 252, 260, 264, 232, 468, 437, 395.21, 395.41; 709/203, 208, 209, 217, 229, 231, 104, 211, 223, 224, 226, 227, 247

(56) References Cited

U.S. PATENT DOCUMENTS

| | | | | |
|---|---|---|---|---|
| 5,822,524 A | * | 10/1998 | Chen et al. | 709/203 |
| 6,006,264 A | * | 12/1999 | Colby et al. | 709/226 |
| 6,041,345 A | * | 3/2000 | Levi et al. | 709/217 |
| 6,050,898 A | * | 4/2000 | Vange et al. | 463/42 |
| 6,125,397 A | * | 9/2000 | Yoshimura et al. | 709/235 |
| 6,172,672 B1 | * | 1/2001 | Ramasubramanian et al. | 345/720 |
| 6,243,761 B1 | * | 6/2001 | Mogul et al. | 709/246 |
| 6,249,530 B1 | * | 6/2001 | Blanco et al. | 370/468 |
| 6,292,834 B1 | * | 9/2001 | Ravi et al. | 709/233 |
| 6,330,609 B1 | * | 12/2001 | Garofalakis et al. | 709/229 |
| 6,390,922 B1 | * | 5/2002 | Vange et al. | 463/42 |
| 6,512,778 B1 | * | 1/2003 | Jones et al. | 370/465 |

\* cited by examiner

Primary Examiner—Phirin Sam
(74) Attorney, Agent, or Firm—Leydig, Voit & Mayer, Ltd.

(57) ABSTRACT

Dynamic sizing of packets of data is disclosed. In one embodiment, a system includes a client and a server. The client receives packets of dynamic size, the client having a bandwidth. The server determines the dynamic size of the packets based on at least one factor. One such factor is the bandwidth of the client. The server sends the packets to the client.

30 Claims, 3 Drawing Sheets

DYNAMIC SIZING OF DATA PACKETS

FIELD

This invention relates generally to packets of data, and more particularly to the dynamic sizing of such packets of data.

BACKGROUND

Networks such as the Internet have become an increasingly popular manner by which to convey information in contexts such as audio and video conferencing, such as by use of software products like MICROSOFT NET MEETING. In audio and video conferencing, a server computer divides data into discrete packets, which are then sent over a network, such as a local-area network (LAN) or the Internet, for receipt by a client computer. The client computer then reassembles the packets into a continuous data stream, and plays back the data. Each packet of data includes a header, which is data including data regarding the type of data stored within the packet, as well as the data within the packet itself.

In general, the packets of data are of predetermined size, regardless of the type of network over which they are conveyed (that is, regardless of whether the network is the Internet, a LAN, etc.), and regardless of the type of data within the packets (that is, regardless of whether such data relates to audio-only conferencing, or both audio and video conferencing). In general, smaller packets of data are desirable because there is less latency, that is, there is less delay from the transmission of the data by the server computer, and ultimate receipt and playback of the data by the client computer. However, more bandwidth is required for smaller packets of data, because the headers for the packets typically do not substantially change in size regardless of the amount of data stored in the packets.

Thus, the predetermined size of the packets of data regardless of the type of network over which they are conveyed and of the type of data within the packets themselves is disadvantageous. For example, faster networks such as LAN s may be able to handle a smaller packet size since such networks afford greater bandwidth. Conversely, slower networks such as that facilitated by modem dial-up connections to the Internet may only be able to handle a larger packet size since such networks have less bandwidth. A given size of the packets of data, however, means that the size of the packets cannot generally be tailored to fit the appropriate type of network and the type of data within the packets. For these and other reasons, there is a need for the present invention.

SUMMARY

The above-identified problems, shortcomings and disadvantages with the prior art, as well as other problems, shortcoming and disadvantages, are solved by the present invention, which will be understood by reading and studying the specification and the drawings. In one embodiment, a system includes a client and a server. The client receives packets of dynamic size, the client having a bandwidth. The server determines the dynamic size of the packets based on at least one factor. One such factor is the bandwidth of the client. The server also sends the packets to the client.

Thus, embodiments of the invention provide for advantages not found in the prior art. For example, where the client has a large bandwidth (because it may, for example, be connected to the server over a relatively fast local-area network (LAN)), the server can use a small packet size, so that latency is reduced. Conversely, where the client has a small bandwidth (because it may, for example, be connected to the server over the Internet through a modem dial-up connection), the server can use a larger packet size, because of the reduced bandwidth.

The invention includes systems, methods, computers, and computer-readable media of varying scope. Besides the embodiments, advantages and aspects of the invention described here, the invention also includes other embodiments, advantages and aspects, as will become apparent by reading and studying the drawings and the following description.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system of one embodiment of the invention is presented. In the third section, a method, in accordance with an embodiment of the invention, is provided. Finally, in the fifth section, a conclusion of the detailed description is provided.

Hardware and Operating Environment

Figure 1:
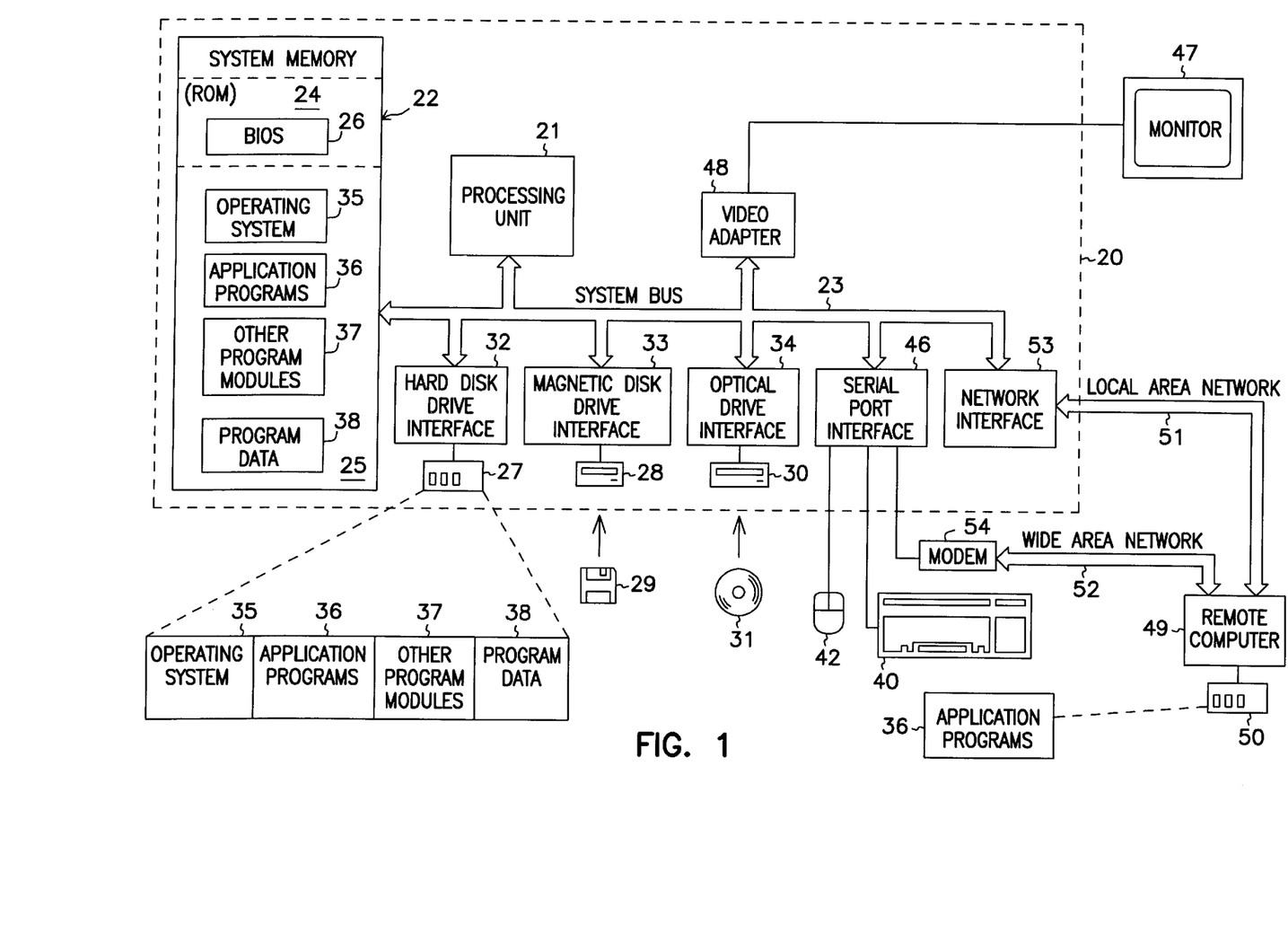
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System

Figure 2:
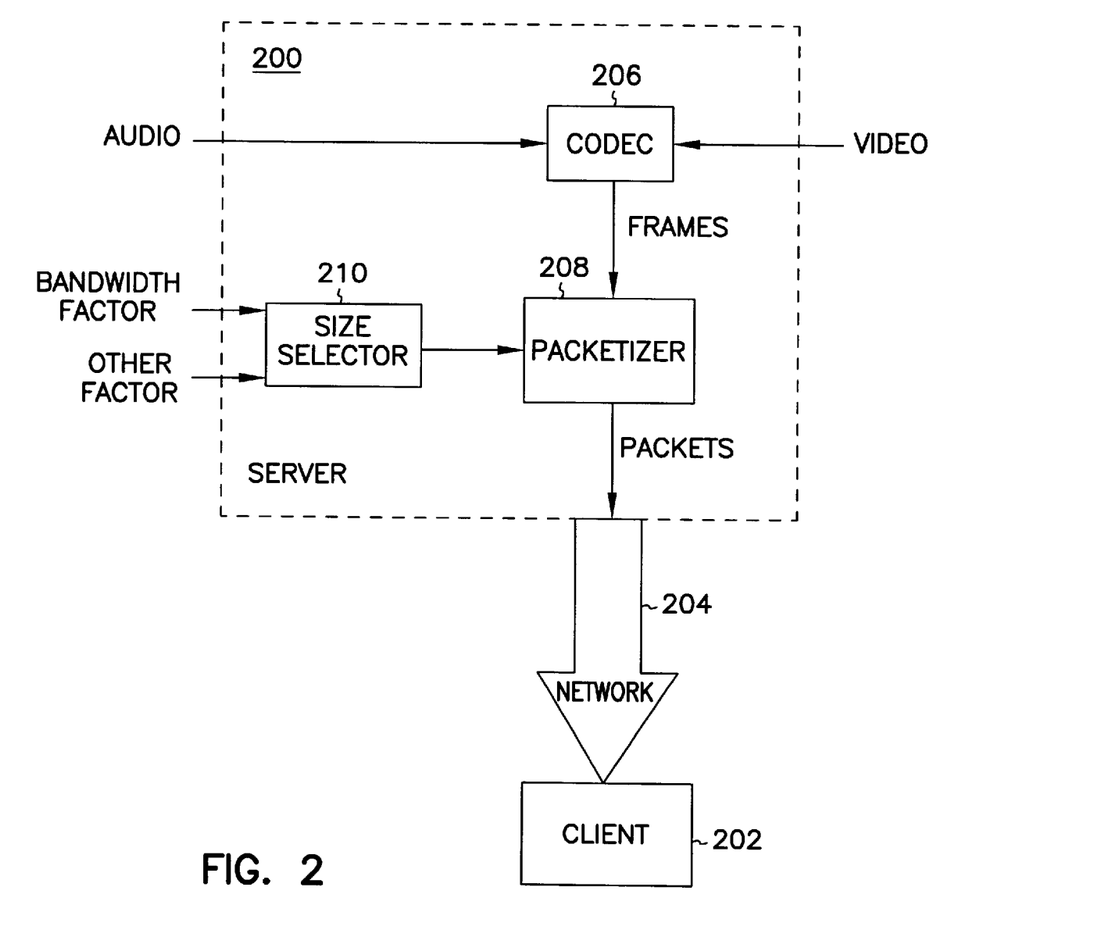
FIG. 2 shows a block diagram of a system according to one embodiment of the invention; and, FIG. 3 shows a flowchart illustrating a method according to one embodiment of the invention.

In this section of the detailed description, a description of a computerized system according to an embodiment of the invention is provided. The description is provided by reference to FIG. 2. Referring now to FIG. 2, a system according to an embodiment of the invention is shown. The system includes a server 200, a client 202, and a network 204. The server 200 is communicatively coupled to the client 202 via the network 204. The server 200 transmits to the client 202 packetized data, the packets of data being of dynamic size. In one embodiment, such data relates to conferencing, such as audio only or both audio and video conferencing. As shown in FIG. 2, there is only one client 202, for sake of illustrative clarity. However, those of ordinary skill within the art can appreciate that the server 200 may communicate with a plurality of clients such as the client 202.

For the purposes of this patent application, the terms client and server are defined as meaning a receiving computer and a sending computer, respectively, and are not meant to convey the meaning of client and server as may be generally used within the art. That is, a server as used herein refers not necessarily to a server computer on a network, as may be customarily understood within the art, but to a computer sending data. Similarly, a client as used herein refers not necessarily to a client computer on a network, as may be customarily understood within the art, but to a computer receiving data.

The server 200 in one embodiment of the invention is a computer as has been described in the preceding section of the detailed description. The server 200 includes a codec (that is, a coder/decoder) 206, a packetizer 208, and a size selector 210. In one embodiment of the invention, each of the packetizer 208, and the size selector 210 can be a separate computer program running on the server 200. The codec 206 can in one embodiment be hardware, and receives audio and/or video content, digitizes this content, and sends it in frames to the packetizer 208. In one embodiment, the codec 206 is a G.723.1 codec, as known within the art, having a fixed output rate of 800 bytes per second and outputting frames with frame sizes of 30 milliseconds each. Thus, the codec 206 in one embodiment has a data frame size.

It is noted that for purposes of clarity, there is only one codec 206 and only one packetizer 208 shown in FIG. 2. However, those of ordinary skill within the art can appreciate that there can be a separate codec 206 and a separate packetizer 208 for each kind of data—for example, one codec and packetizer pair for audio data, and another codec and packetizer pair for video data. In one embodiment of the invention, the packet size is dynamically adjusted only for audio data, since in general video data does not have the same latency problems as audio data, as understood within the art. However, the invention is not so limited.

The packetizer 208 receives the data as framed by codec 206 and organizes the data into separate packets of dynamic size, as determined by the size selector 210. Each packet desirably includes a header in addition to the data itself. The header in one embodiment can include a 20-byte IP header, an 8-byte UDP header, and a 12-byte RTP-payloader, all of which are known within the art, for a total header size of 40 bytes. After the packetizer 208 packetizes the data, the packets of data are sent over the network 204 to the client 202 for receipt and playback.

The size selector 210 determines the dynamic size of the packets used by the packetizer 208. The size of the packets are based on at least one factor; the invention is not limited to a particular number or type of factors used by the packetizer 208, however. In one embodiment, one factor is the bandwidth of the client 202. The bandwidth of the client 202 can be dictated by the type of the network 204 (e.g., a local-area network (LAN) having a relatively high bandwidth), or the manner by which the client 202 connects to the network 204 (e.g., a modem dial-up connection to the Internet, having a relatively low bandwidth). In general, the higher the bandwidth of the client 202, the smaller the size of the packets as determined by the size selector 210, and vice-versa.

As used throughout this application, the bandwidth factor of the client 202 is identified as a determining factor of the dynamic size of the packets used by the packetizer 208 with the assumption that the client 202 has a lower bandwidth than the server 200. However, this is only one particular case, as those of ordinary skill within the art can appreciate. As to the general case, the bandwidth factor as a determining factor of the dynamic size of the packets is the lower bandwidth of the sender's bandwidth and the receiver's bandwidth. Thus, if the sender's bandwidth is lower than the receiver's bandwidth, it is the former that is a determining factor of the dynamic size of the packets. The invention covers the general case as well as the more particular case used solely for exemplary purposes herein. Thus, as used in this application, the phrase "the client has a bandwidth" refers to the available bandwidth between the client and the server, which is lower bandwidth of the sender's bandwidth and the receiver's bandwidth; the phrase does not necessarily only refer to the bandwidth of the client itself.

The bandwidth of the client 202 as used as a factor by the size selector 210 to determine the size of the packets transmitted by the server 200 through the network 204 to the client 202 in one embodiment can be an assumed bandwidth, while in another embodiment can be an actual bandwidth. That is, in one embodiment, a user of the client 202 can indicate the type of connection being used (dial-up modem, LAN, etc.), such that the size selector 210 assumes a different bandwidth for different such connections (for example, 28.8 kilobits per second in the case of a dial-up modem, 90 kilobits per second in the case of a LAN, etc.), regardless of the actual bandwidth of the client 202 (for example, a noisy phone line may cause the dial-up modem to transfer data at significantly less than 28.8 kilobits per second). In another embodiment, the actual bandwidth of the client 202 can be used, for example, by monitoring the connection between the server 200 and the client 202 and measuring the bandwidth at which the client 202 actually receives data.

Another factor used by the size selector 210 in one embodiment of the invention to determine packet size is the data frame size of the codec 206. For example, the size selector 210 can change the determined packet size such that it is an integral multiple of the data frame size of the codec. Thus, if the size selector 210 determines that a packet size of 32 milliseconds is desirable, but the frame size of the codec 206 is 30 milliseconds, it may decrease the packet size also to 30 milliseconds, so that it is an integral multiple of the data frame size of the codec. This is to ensure that data as received by the packetizer 208 from the codec 206 is able to be inserted neatly into packets of data for transmission over the network 204 to the client 202.

Another factor used by the size selector 210 in one embodiment of the invention to determine packet size is the video receive capabilities of the client 202. For example, if the client 202 is able to receive video on a speed comparable to LAN-type speeds, and assuming that the type of data sent by the server 200 includes video as well as audio data, then the size selector 210 can dictate a lower packet size, to decrease latency, since the client 202 has the bandwidth necessary to accommodate such a lower packet size. Conversely, if the client 202 is not able to receive video on a speed comparable to LAN-type speeds, then the size selector 210 can dictate a higher packet size.

Another factor used by the size selector 210 in one embodiment of the invention to determined packet size is the video transmit capabilities of the server 200. For example, the size selector 210 can determine whether the server 200 is in actuality sending video data to the client 202, which may require a larger packet size due to the increased amount of data that must be sent in the case of video data, as compared to audio-only data. Conversely, if the server 200 is not sending video data, and thus is only sending audio data, a smaller packet size may be determined by the size selector 210.

As has been described, the server 200 sends the packets of data to the client 202 over the network 204. The invention is not particularly limited to a given type of network 204. In one embodiment, the network 204 can be the Internet, such that the client 202 connects thereto via a dial-up connection such as a modem, an Integrated Services Digital Network (ISDN) connection, etc., as known within the art. In another embodiment, the network can be a local-area network (LAN) or a wide-area network (WAN). Furthermore, the network 204 can be the Internet, while the client 202 connects to the Internet over a LAN via a T1 line, as known within the art, or other type of high-speed Internet connection. The invention is not so limited.

The client 202 is in one embodiment a computer as has been described in the preceding section of the detailed description. The client 202 receives the data sent by the server 200 in packets, reassembles the data into a continuous stream from the packets of data, and plays back the data to a user of the client 202. The client 202 can in one embodiment have a modem to connect the client over the network 204 with the server 200. The client 202 in another embodiment can have an ISDN connection to couple the client over the network 204 with the server 200. The invention is not so limited.

As has been described, the client 202 has a bandwidth. The bandwidth of the client 202 is the throughput at which the client 202 is able to receive packets of data from the server 200. The bandwidth of the client 202 may be determined by the type of the network 204, by the type of the connection used by the client 202 to connect to the network 204, etc. In different embodiments of the invention, the bandwidth of the client 202 is: a modem bandwidth of 14,400 bits per second (bps), a modem bandwidth of 28,800 bps, a LAN bandwidth, and an ISDN bandwidth.

The invention provides for advantages not found within the prior art. The size selector of the server is able to determine a dynamic packet size of the packets of data sent by the server to the client to achieve substantially the highest quality of data playback at the client that is possible. That is, the size selector is able to take into account the bandwidth of the client, the data frame size of the codec of the server, the video receive capabilities of the client, and the video transmit capabilities of the server, such that a desirably optimal dynamic packet size is selected. Those of ordinary skill within the art can appreciate, however, that other applications and advantages of the invention also exist.

Method

In this section of the detailed description, a method according to an embodiment of the invention is presented. This description is provided in reference to FIG. 3. The computerized method is desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer. Thus, in one embodiment, a computer program is executed by a processor of a server computer from a medium therefrom to determine a dynamic size of packets to be sent to a client computer, based at least one factor, such as the bandwidth of the client.

Figure 3:
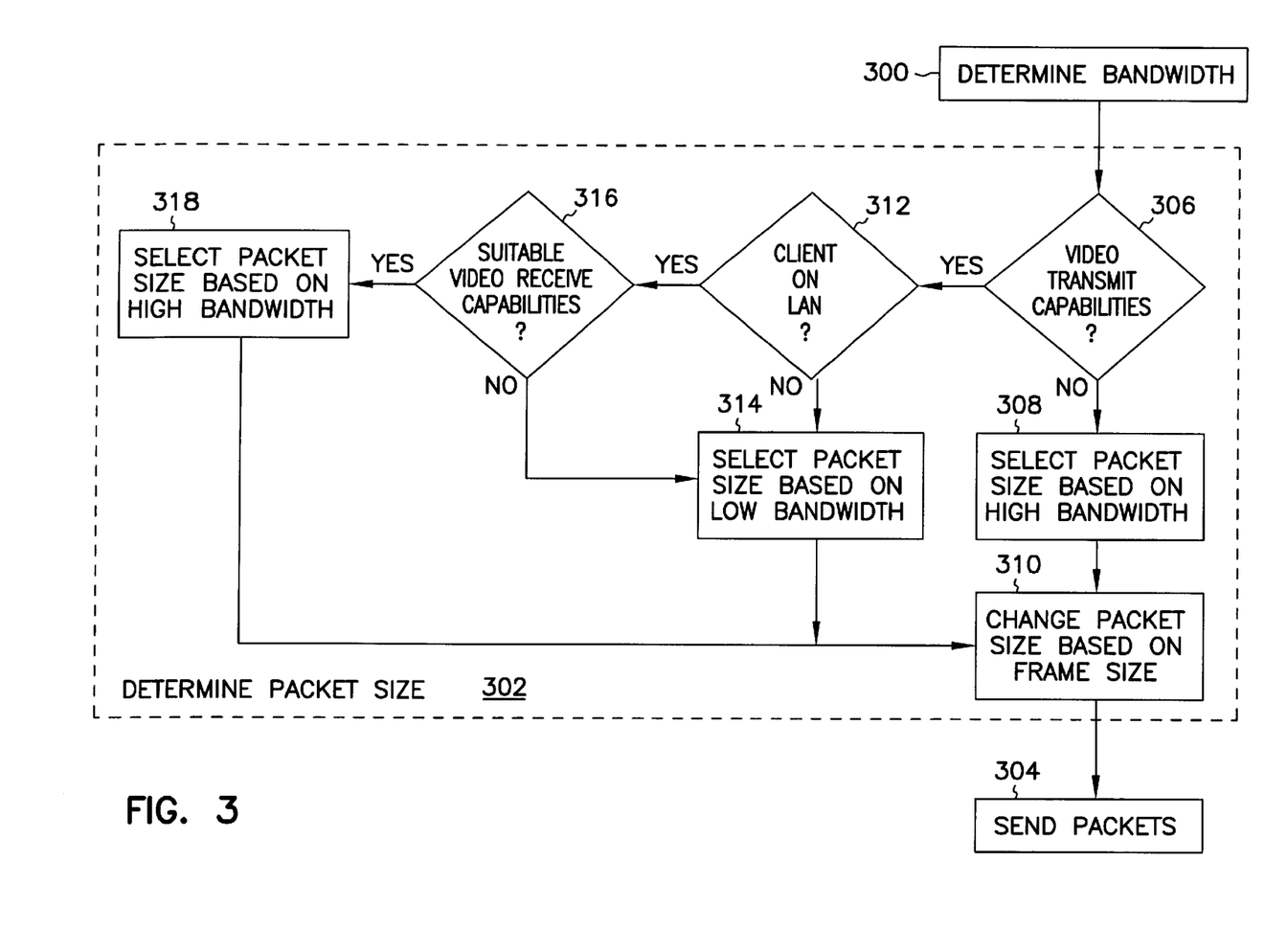

Referring now to FIG. 3, a flowchart of a method according to one embodiment of the invention is shown. In 300, the bandwidth of a client is determined. The bandwidth may be assumed that is, selecting a bandwidth based on the type of connection the client has to a server (such as dial-up modem, LAN, etc.) or it may be the actual bandwidth of transmission between the client and the server. Bandwidths of the client can in one embodiment include: a modem bandwidth of 14,400 bits per second (bps), a modem bandwidth of 28,800 bps, a LAN bandwidth, and an ISDN bandwidth. The invention itself is not so limited, however.

In 302, the dynamic size of the packets to be sent to the client is determined, based on at least one factor including the bandwidth of the client. The invention is not particularly limited to a number or type of factors; however, in one embodiment, the factors can also be one or more of the following: a data frame size of a codec of the server, video transmit capabilities of the server, and video receive capabilities of the client. These factors have been described in the previous section of the detailed description. Finally, in 304, the packets of the dynamic size determined in 302 are sent to the client.

In one embodiment of the invention, the dynamic size of the packets to be sent to the client can be determined as is now described. In 306, it is determined whether the server has video transmit capabilities, as has been described in the preceding section of the detailed description. That is, it is determined whether the packets of data to be sent to the client include video-related data, as opposed to only audio-related data, and whether the server is able to send such video-related data. If the video transmit capabilities are not being used, then in 308, a dynamic packet size is selected based on the bandwidth of the client. In 310, this selected dynamic packet size is changed or adjusted so that it is an integral number of the frame size of the codec, as has been described in the previous section of the detailed description.

However, if in 306 it is determined that the video transmit capabilities are being used, then in 312, it is determined whether the client is part of a LAN, or otherwise has LAN-type bandwidth available, as has been described in the preceding section of the detailed description. If the client is apart from a LAN, or does not otherwise have LAN-type bandwidth available, then in 314, a dynamic packet size is selected based on a predetermined low bandwidth, for example, such as a predetermined low bandwidth based on a modem bandwidth of 14,400 bps. Control then proceeds to 310, where again the selected dynamic packet size is changed or adjusted so that it is an integral number of the frame size of the codec.

If in 312 it is determined that the client is part of a LAN, or otherwise has LAN-type bandwidth available, then in 316 it is determined whether the client has suitable video receive capabilities, as has been described in the previous section of the detailed description. That is, it is determined whether the client has video receive capabilities such that the client can accommodate its LAN or LAN-type bandwidth. If the client does not have suitable video receive capabilities, then in 314, again, a dynamic packet size is selected based on a predetermined low bandwidth. However, if the client does have suitable video receive capabilities, then in 318 a dynamic packet size is selected based on a predetermined high bandwidth, such as a predetermined high bandwidth based on a LAN bandwidth of at least 90 kilobits per second. In either case, control proceeds next to step 310, where again the selected dynamic packet size is changed or adjusted so that it is an integral number of the frame size of the codec.

In one particular embodiment of the invention, in 308 where the packet size is selected based on the bandwidth of the client (i.e., in the case where the server does not have video transmit capabilities or is otherwise not transmitting video data, as tested for in 306), then the packets are selected to have a duration (that is, the packets have a dynamic size) as follows. If the bandwidth is based on a 14,400 bps modem, then the packet duration (packet size) is 90 milliseconds. If the bandwidth is based on 28,800 bps modem, then the packet duration is 64 milliseconds. If the bandwidth is based on an ISDN or LAN bandwidth, then the packet duration is 32 milliseconds.

Furthermore, in one particular embodiment of the invention, in 314 where the packet size is selected as based on a predetermined low bandwidth (such that where the video transmit capabilities of the server have been successfully tested for in 306, but either the client is not on a LAN as tested for in 312 or the client is on a LAN but does not have suitable video receive capabilities as tested for in 316), then the packet duration (packet size) is 90 milliseconds. Finally, in one particular embodiment, in 318 where the packet size is selected as based on a predetermined high bandwidth (such that where the video transmit capabilities of the server has been successfully tested for in 306, the client is on a LAN as tested for in 312, and the client has suitable video receive capabilities as tested for in 316), then the packet duration (packet size) is 32 milliseconds.

A method according to an embodiment of the invention has been described. The invention according to this embodiment provides for dynamic sizing of packets of data. If video is not being transmitted (either because the data does not relate to video or the server does not have video transmit capabilities), then a packet size is selected based on the client s bandwidth, and then changed according to the codec frame size. If video is being transmitted but the client is not a LAN, of if the client is on a LAN but does not have suitable video receive capabilities, then a packet size is selected based on a predetermined low bandwidth, so that a compromise is reached in light of the fact that both audio and video are being transmitted. If video is being transmitted to a client on a LAN that has suitable video receive capabilities, then the packet size is selected based on a predetermined high bandwidth, to take advantage of the fact that this high bandwidth is available. In both of these latter cases, the packet size is also changed according to the codec frame size.

Conclusion

Dynamic sizing of packets of data has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A system comprising:
   a client to receive packets of dynamic size, the client having a bandwidth; and,
   a server to determine the dynamic size of the packets based on at least one factor including the bandwidth of the client and to send the packets to the client.

2. The system of claim 1, wherein the server comprises a codec having a data frame size.

3. The system of claim 2, wherein the at least one factor further includes the data frame size of the codec.

4. The system of claim 1, wherein the at least one factor further includes video receive capabilities of the client.

5. The system of claim 1, wherein the at least one factor further includes video transmit capabilities of the server.

6. The system of claim 1, wherein the bandwidth of the client comprises an assumed bandwidth.

7. The system of claim 1, wherein the bandwidth of the client comprises an actual bandwidth.

8. The system of claim 1, wherein the bandwidth of the client is selected from the group essentially consisting of: a modem bandwidth of 14,400 bits per second (bps); a modem bandwidth of 28,800 bps; a local-area network (LAN) bandwidth; and, an Integrated Services Digital Network (ISDN) bandwidth.

9. The system of claim 1, further comprising a local-area network (LAN) coupling the client with the server.

10. The system of claim 1, wherein the client further comprises a modem to couple the client over the Internet with the server.

11. The system of claim 1, wherein the client further comprises an Integrated Services Digital Network (TSDN) connection to couple the client over the Internet with the server.

12. A system comprising:
   a client to receive packets of dynamic size, the client having a bandwidth selected from the group essentially consisting of; a modem bandwidth of 14,400 bits per second (bps), a modem bandwidth of 28,800 bps, a local-area network (LAN) bandwidth, and, an Integrated Services Digital Network (ISDN) bandwidth; and,
   a server to send the packets to the client and to determine the dynamic size of the packets based on at least one factor including: the bandwidth of the client, a data frame size of a codec of the server, video receive capabilities of the client and, video transmit capabilities of the server.

13. The system of claim 12, wherein the bandwidth of the client is selected from the group essentially consisting of: an assumed bandwidth and an actual bandwidth.

14. A method comprising:
   determining a bandwidth of a client; and,
   determining a dynamic size of packets to be sent to the client based on at least one factor including the bandwidth of the client.

15. The method of claim 14, further comprising sending the packets of the dynamic size to the client.

16. The method of claim 14, wherein determining the bandwidth of the client comprises selecting an assumed bandwidth of the client.

17. The method of claim 14, wherein determining the bandwidth of the client comprises determining an actual bandwidth of the client.

18. The method of claim 14, wherein determining the dynamic size of the packets comprises:
   determining whether video transmit capabilities are used; and,
   upon determining that video transmit capabilities are unused, selecting the dynamic size of the packets based on the bandwidth of the client.

19. The method of claim 18, wherein determining the dynamic size of the packets further comprises changing the dynamic size of the packets to be an integral number of a frame size of a codec.

20. The method of claim 18, wherein determining the dynamic size of the packets further comprises upon determining that video transmit capabilities are used:
   determining whether the client is part of a local-area network (LAN); and,
   upon determining that the client is apart of the LAN, selecting the dynamic size of the packets based on a predetermined low bandwidth.

21. The method of claim 20, wherein determining the dynamic size of the packets further comprises changing the dynamic size of the packets to be an integral number of a frame size of a codec.

22. The method of claim 20, wherein the predetermined low bandwidth is based on a modem bandwidth of 14,400 bits per second.

23. The method of claim 20, wherein determining the dynamic size of the packets further comprises upon determining that the client is part of the LAN:

determining whether the client has suitable video receive capabilities;

upon determining that the client has suitable video receive capabilities, selecting the dynamic size of the packets based on a predetermined high bandwidth; and, upon determining that the client has unsuitable video receive capabilities, selecting the dynamic size of the packets based on the predetermined low bandwidth.

24. The method of claim 23, wherein determining the dynamic size of the packets further comprises changing the dynamic size of the packets to be an integral number of a frame size of a codec.

25. The method of claim 23, wherein the predetermined high bandwidth is based on a LAN bandwidth.

26. The method of claim 14, wherein the bandwidth of the client is selected from the group essentially consisting of: a modem bandwidth of 14,400 bits per second; a modem bandwidth of 28,800 bps; a local-area network (LAN) bandwidth; and, an Integrated Services Digital Network (ISDN) bandwidth.

27. A computer comprising:

a processor;

a computer-readable medium; and, a computer program executed by the processor from the medium to determine a dynamic size of packets to be sent to a client based on at least one factor including the bandwidth of the client.

28. The computer of claim 27, wherein the at least one factor includes at least one of the group essentially consisting of: a data frame size of a codec, video transmit capabilities, and, video receive capabilities of the client.

29. A computer-readable medium having a computer program stored thereon for execution on a computer to determine a dynamic size of packets to be sent to a client based on at least one factor including the bandwidth of the client.

30. The medium of claim 29, wherein the at least one factor includes at least one of the group essentially consisting of: a data frame size of a codec, video transmit capabilities, and, video receive capabilities of the client.

* * * * *

UNITED STATES PATENT AND TRADEMARK OFFICE
CERTIFICATE OF CORRECTION

PATENT NO. : 6,728,263 B2
DATED : April 27, 2004
INVENTOR(S) : Joy et al.

Page 1 of 1

It is certified that error appears in the above-identified patent and that said Letters Patent is hereby corrected as shown below:

<u>Column 10,</u>
Line 7, "(TSDN)" should read -- (ISDN) --.
Line 13, "of;" should read -- of: --.

Signed and Sealed this

Seventh Day of September, 2004

JON W. DUDAS
*Acting Director of the United States Patent and Trademark Office*